(12) United States Patent
Mittleman

(10) Patent No.: US 8,620,162 B2
(45) Date of Patent: Dec. 31, 2013

(54) HANDHELD ELECTRONIC DEVICE WITH INTEGRATED TRANSMITTERS

(75) Inventor: Adam D. Mittleman, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 731 days.

(21) Appl. No.: 12/732,101

(22) Filed: Mar. 25, 2010

(65) Prior Publication Data

US 2011/0235281 A1  Sep. 29, 2011

(51) Int. Cl.
*H04B 10/00* (2013.01)

(52) U.S. Cl.
USPC .......... 398/106; 398/118; 398/128; 398/130; 398/135; 398/115; 398/116; 398/117; 361/681; 361/818; 361/807; 361/728; 455/420; 455/566; 455/575.1; 345/173; 345/156; 345/169; 340/825.69; 340/825.72; 340/825.22

(58) Field of Classification Search
USPC ......... 398/106, 107, 135, 118, 119, 120, 128, 398/129, 130, 131, 136, 115, 117, 116; 361/681, 818, 679, 807, 728; 455/73, 455/420, 550.1, 566, 575.1, 92; 345/169, 345/173, 168, 167, 156; 340/825.69, 340/825.72, 825.22
See application file for complete search history.

(56) References Cited

U.S. PATENT DOCUMENTS

| | | | |
|---|---|---|---|
| 3,995,104 A | 11/1976 | Wasserman | |
| 4,767,168 A | 8/1988 | Grandy | |
| 4,869,566 A | 9/1989 | Juso et al. | |
| 4,896,939 A | 1/1990 | O'Brien | |
| 4,902,092 A | 2/1990 | Grandy | |
| 4,989,935 A | 2/1991 | Stein | |
| 5,280,554 A | 1/1994 | Gleim et al. | |
| 5,446,783 A * | 8/1995 | May | 455/557 |
| 5,530,578 A * | 6/1996 | Takemoto et al. | 398/41 |

(Continued)

FOREIGN PATENT DOCUMENTS

| | | |
|---|---|---|
| EP | 1 182 848 A1 | 2/2002 |
| EP | 1 318 576 A1 | 6/2003 |
| EP | 1 257 017 B1 | 7/2004 |
| JP | 2000-315553 A | 11/2000 |

OTHER PUBLICATIONS

Terlizzi et al., U.S. Appl. No. 12/622,405, filed Nov. 19, 2009.
Terlizzi et al., U.S. Appl. No. 12/622,409, filed Nov. 19, 2009.

*Primary Examiner* — Hanh Phan
(74) *Attorney, Agent, or Firm* — Treyz Law Group; G. Victor Treyz; David C. Kellogg

(57) ABSTRACT

An electronic device may include wireless circuitry such as infrared sources that control external equipment such as televisions and set-top boxes. An infrared source may be mounted within an electronic device housing in a visually inconspicuous location such as in a connector port. A button may be provided with transparent structures that allow infrared light to pass through the button. A removable accessory port may be provided with an infrared transmitter accessory that allows an electronic device to serve as a remote control device. Portions of an electronic device housing may be provided with thin housing walls or holes that are too small to be noticeable to the naked eye to serve as windows for infrared light. An audio port may serve as an infrared light window. Gasket structures, bezel structures, and the edges of displays and other planar glass members may be used in transmitting infrared light.

21 Claims, 15 Drawing Sheets

(56) References Cited

U.S. PATENT DOCUMENTS

| | | | |
|---|---|---|---|
| 5,781,321 A * | 7/1998 | Kobayashi | 398/115 |
| 5,822,101 A * | 10/1998 | Deguchi | 398/129 |
| 6,109,797 A | 8/2000 | Nagura et al. | |
| 6,141,424 A | 10/2000 | Takiguchi et al. | |
| 6,238,249 B1 | 5/2001 | Kuwamura | |
| 6,278,786 B1 | 8/2001 | McIntosh | |
| 6,420,964 B1 | 7/2002 | Nishikawa et al. | |
| 6,525,854 B1 | 2/2003 | Takahashi et al. | |
| 6,599,025 B1 | 7/2003 | Deutsch | |
| 6,885,754 B2 | 4/2005 | Lazzeroni et al. | |
| 6,905,255 B2 | 6/2005 | Flanders et al. | |
| 6,947,766 B2 | 9/2005 | Chan et al. | |
| 7,156,690 B2 | 1/2007 | Tolmie | |
| 7,160,032 B2 | 1/2007 | Nagashima et al. | |
| 7,217,958 B2 | 5/2007 | Aruga et al. | |
| 7,327,919 B1 | 2/2008 | Ko | |
| 7,499,616 B2 | 3/2009 | Aronson et al. | |
| 7,896,708 B2 * | 3/2011 | Agevik | 439/669 |
| 2002/0102949 A1 | 8/2002 | Langer | |
| 2002/0159716 A1 | 10/2002 | Ohbayashi et al. | |
| 2002/0177364 A1 | 11/2002 | Mine et al. | |
| 2003/0016920 A1 | 1/2003 | Sohmura et al. | |
| 2004/0022543 A1 | 2/2004 | Hosking et al. | |
| 2004/0204081 A1 | 10/2004 | Kim | |
| 2007/0018947 A1 | 1/2007 | Toro-Lira | |
| 2007/0054705 A1 | 3/2007 | Liow et al. | |
| 2007/0155418 A1 * | 7/2007 | Shau et al. | 455/550.1 |
| 2007/0177741 A1 | 8/2007 | Williamson | |
| 2007/0220560 A1 | 9/2007 | Devine | |
| 2007/0264019 A1 * | 11/2007 | Nien et al. | 398/106 |
| 2008/0037941 A1 | 2/2008 | Mallya et al. | |
| 2008/0131058 A1 | 6/2008 | Tsunoda | |
| 2008/0212971 A1 * | 9/2008 | Shaanan et al. | 398/130 |
| 2008/0318629 A1 | 12/2008 | Inha et al. | |
| 2009/0051486 A1 * | 2/2009 | Denison et al. | 340/5.25 |
| 2009/0110404 A1 | 4/2009 | Agevik | |
| 2009/0175456 A1 | 7/2009 | Johnson | |
| 2009/0180659 A1 | 7/2009 | Sander et al. | |
| 2009/0191914 A1 | 7/2009 | Stahl | |
| 2010/0124845 A1 | 5/2010 | Sabo et al. | |
| 2011/0003550 A1 | 1/2011 | Klinghult et al. | |
| 2011/0128228 A1 * | 6/2011 | Van Der Byl | 345/167 |
| 2011/0223899 A1 * | 9/2011 | Hiraide | 455/420 |

* cited by examiner

HANDHELD ELECTRONIC DEVICE WITH INTEGRATED TRANSMITTERS

BACKGROUND

This relates generally to electronic devices, and more particularly, to electronic devices with integrated transmitters.

Electronic devices such as computers and cellular telephones are often provided with wireless communications circuitry such as local area network wireless circuitry and cellular telephone communications circuitry. This circuitry may be used to support cellular telephone calls and data links. In some scenarios, it may be possible to use a wireless link such as a wireless local area network link to remotely control an external component such as a computer that is running a compatible software program. Consumer electronics equipment such as compact disk players and televisions is typically not capable of being controlled in this way. Users of this type of equipment are generally forced to use dedicated infrared remote controls or complex accessories.

It would therefore be desirable to provide electronic devices with integrated wireless transmitters for controlling external equipment.

SUMMARY

An electronic device may include wireless circuitry such as infrared sources that control external equipment such as televisions and set-top boxes. To minimize visual clutter, infrared sources may be located in portions of an electronic device that are not readily identifiable as infrared light ports to a user of the device.

With one suitable arrangement, infrared light windows are formed from structures that blend with the housing of a device. An infrared light window may, for example, be formed from microperf holes in housing walls. These holes have small diameters and are therefore not readily noticed by a user. Light may also be emitted through wall portions that are thin enough to pass infrared light.

Infrared light windows may be hidden in plain sight by placing infrared sources within portions of existing ports. An infrared source may, for example, be placed at the interior end of an audio jack cavity so that infrared light is emitted along the longitudinal axis of the audio jack. Infrared sources may also be mounted within input-output data ports and audio ports such as speaker and microphone ports.

A button may be provided with transparent structures that allow infrared light to pass through the button. An infrared source may be mounted at a fixed location within a housing or within a cavity inside the button.

A removable accessory port may be provided with an infrared transmitter accessory that allows an electronic device to serve as a remote control device.

Gasket structures, bezel structures, mirror structures, and the edges of displays and other planar glass members may also be used in transmitting infrared light from within an electronic device to external equipment.

Further features of the invention, its nature and various advantages will be more apparent from the accompanying drawings and the following detailed description of the preferred embodiments.

DETAILED DESCRIPTION

Figure 1:
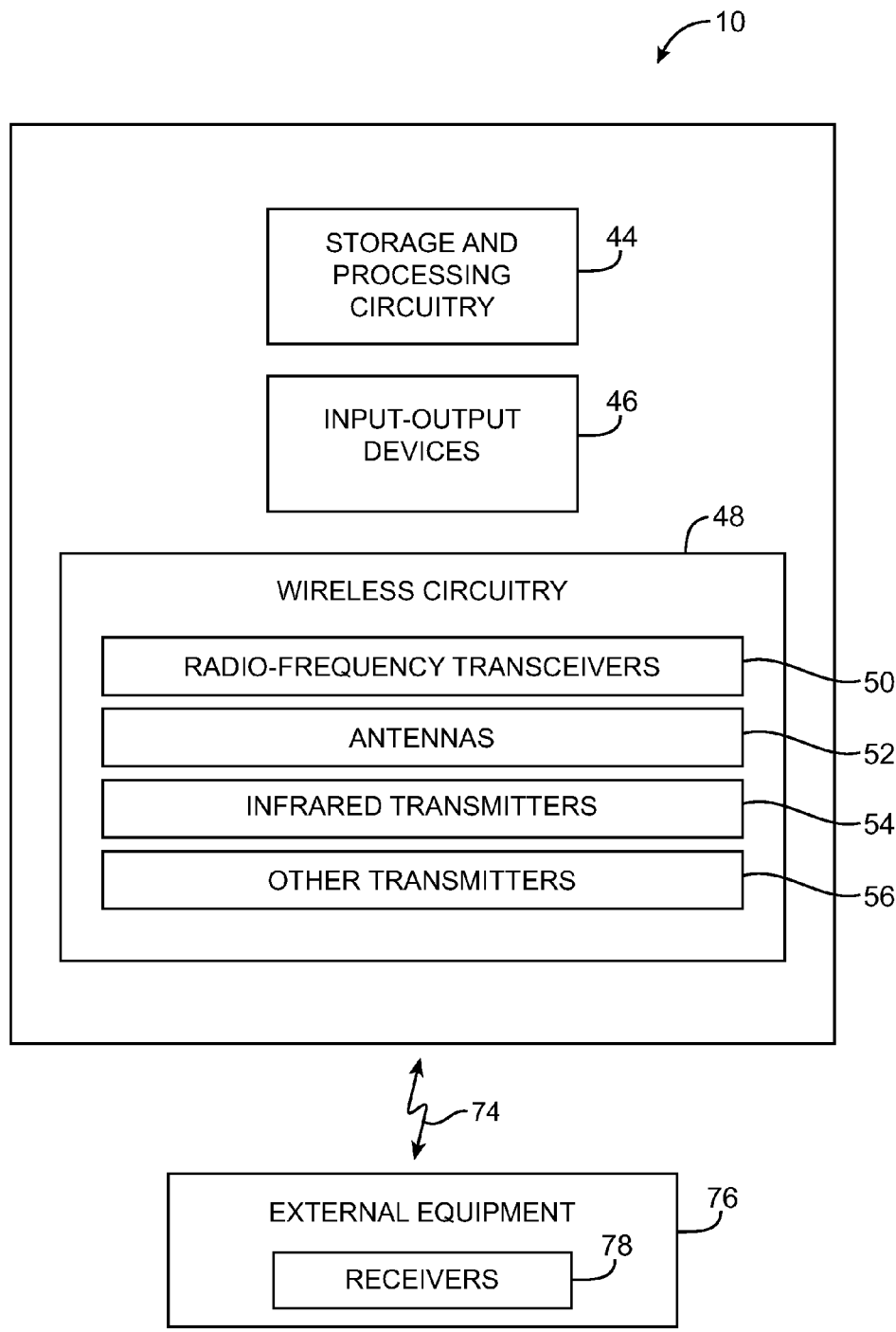
FIG. 1 is a schematic diagram of an illustrative electronic device in wireless communication with external equipment in accordance with an embodiment of the present invention.

Electronic devices such as portable computers and cellular telephones may be provided with wireless circuitry for wirelessly controlling external equipment. An illustrative system in which an electronic device wirelessly controls external equipment is shown in FIG. 1. As shown in FIG. 1, electronic device 10 may control external equipment 76 by issuing wireless signals 74. External equipment 76 may include televisions, set-top boxes, disc players, computers, game consoles, and other electronic equipment. The control commands that are sent to equipment 76 in signal 74 may include volume control commands, playback commands (stop, play, fast forward, reverse, pause), channel change commands, mode selection commands, input port control commands, etc.

Wireless signals 74 may include infrared light, visible light, acoustic signals, radio-frequency electromagnetic signals, or other electromagnetic signals. External equipment 76 may include one or more receivers such as receiver circuitry 78 to receive wireless signals 74. For example, in scenarios in which wireless signals 74 include light, receivers 78 may include a light detector such as an infrared detector. In scenarios in which wireless signals 74 include radio-frequency signals, receivers 78 may include radio-frequency antennas and radio-frequency receiver circuitry.

Unidirectional communications schemes (i.e., communications schemes in which only device 10 transmits wireless signals 74) and bidirectional communications schemes (i.e., communications schemes in which both device 10 and external equipment 76 transmit wireless signals 74) may be used. In a typical infrared signaling scheme, signals are transmitted exclusively from device 10 to equipment 76. In radio-frequency signaling schemes, bidirectional communications may be used (as an example).

Electronic device 10 may be a relatively stationary device such as a desktop computer or a computer monitor that includes an embedded computer or may be a portable electronic device such as a tablet computer, a handheld device such as a cellular telephone or media player, or a small wearable device such as a wristwatch or pendant device. The use of portable electronic devices such as cellular telephones and other to transmit wireless signals is sometimes described herein as an example. This is, however, merely illustrative. Electronic device 10 may be any suitable electronic equipment.

As shown in FIG. 1, electronic device 10 may include storage and processing circuitry 44, input-output devices 46, and wireless communications circuitry 48.

Storage and processing circuitry 44 may include storage such as hard disk drives, solid state drives, and other nonvolatile memory. Storage in circuitry 44 may also include volatile memory devices such as dynamic and static random-access memory chips. Storage may be implemented using stand-alone integrated circuits and may be embedded within other integrated circuits. For example, microprocessors may include cache memory and application-specific integrated circuits may include registers. Processing circuitry in circuitry 44 may be based on one or more microprocessors, microcontrollers, digital signal processing circuits, application-specific integrated circuits, or other processors. Software code may be stored in storage and processing circuitry 44. When run on storage and processing circuitry 44, the code may direct device 44 to implement desired functions. For example, the code may be used to implement customized remote control applications for device 10.

Input-output devices 46 may be used to supply data from within device 10 to external equipment. Input-output devices 46 may also be used to receive information from external equipment. Examples of input-output devices that may be included in device 10 include displays, cameras, microphones, speakers, buttons, keyboards, trackpads, touch screens, ambient light sensors, motion sensors, proximity sensors, and other sensors, status indicators such as light-emitting diodes, audio-jacks, input-output ports such as ports for universal serial bus plugs, 30-pin data plugs, other data connectors, etc.

Wireless circuitry 48 may be used to form local and remote wireless links with external equipment 16. Wireless circuitry 48 may include radio-frequency transceiver circuitry 50 such as radio-frequency transceivers for supporting local wireless links (e.g., IEEE 802.11 and Bluetooth® links) and radio-frequency transceivers for supporting remote wireless links such as cellular telephone links. If desired, radio-frequency transceivers 50 may include transceivers for interfacing with wirelessly controlled mechanical devices in a user's home (e.g., wirelessly controlled door locks, wirelessly controlled lights, wirelessly controlled garage doors, etc.). Antennas 52 may be coupled to transceiver circuitry 50 to transmit and receive radio-frequency signals. Wireless circuitry 48 may also include light transmitters such as visible light sources and infrared light sources (e.g., infrared transmitters 54). Light sources in device 10 may be based on light-emitting diodes, lasers, or other sources that produce light.

Other transmitters such as transmitters 56 may also be include in device 10 (e.g., transmitters based on short-range electromagnetic effects, transmitters based on sound such as ultrasonic transducers, etc.).

Figure 2:
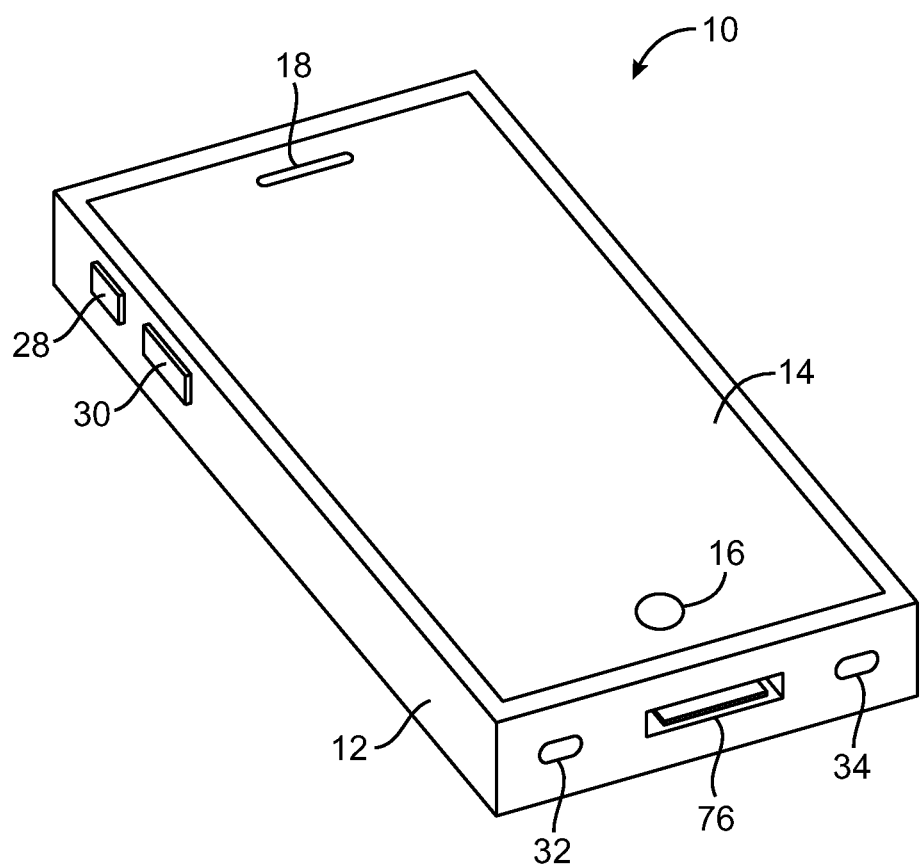
FIG. 2 is a perspective view of an illustrative electronic device with an integral transmitter showing the top end of the device in accordance with an embodiment of the present invention.

A perspective view of an illustrative electronic device that may be provided with wireless communications circuitry 48 is shown in FIG. 2. As shown in FIG. 2, electronic device 10 may include a device housing such as device housing 12. Display 14 may be mounted to the front face of housing 12. One or more buttons such as button 16, button 28, and button 30 may be included in device 10. With the illustrative configuration of FIG. 2, button 16 is mounted in a hole in the cover glass portion of display 14. Buttons 28 and 30 are mounted in housing 12. If desired, other button mounting locations may be used (e.g., on the upper and lower ends of device 10). The arrangement of FIG. 2 is merely illustrative.

Housing 12, which is sometimes referred to as a case, may be formed of any suitable materials including, plastic, glass, ceramics, carbon-fiber composites and other composites, metal, other suitable materials, or a combination of these materials. A unibody construction may be used for device 10 in which case some or all of housing 12 may be formed from a single piece of material. Housing 12 may, for example, be formed from a piece of plastic or metal that covers the sidewalls of device 10 and that covers the rear surface of device 10. Frame members and other components may be mounted in the unibody housing. With another illustrative arrangement, housing 12 may be implemented using multiple structures that are assembled together. For example, housing 12 may be formed from a central frame to which a rear glass panel is attached (as an example). Other configurations may be used if desired.

Display 14 may have a cover glass layer that covers both active and inactive portions of the display. Display 14 may, for example, be a touch screen that incorporates capacitive touch electrodes. Display 14 may include a central active region with image pixels formed from light-emitting diodes (LEDs), organic LEDs (OLEDs), plasma cells, electronic ink elements, liquid crystal display (LCD) components, or other suitable image pixel structures. The borders of display 14 may be inactive. Openings in the cover glass layer may be provided for button 16 and speaker port 18. Openings in housing 12 may also be provided for microphones (e.g., microphone port 32), speakers (e.g., speaker port 34), input-output connectors (e.g., data port 76), etc.

Figure 3:
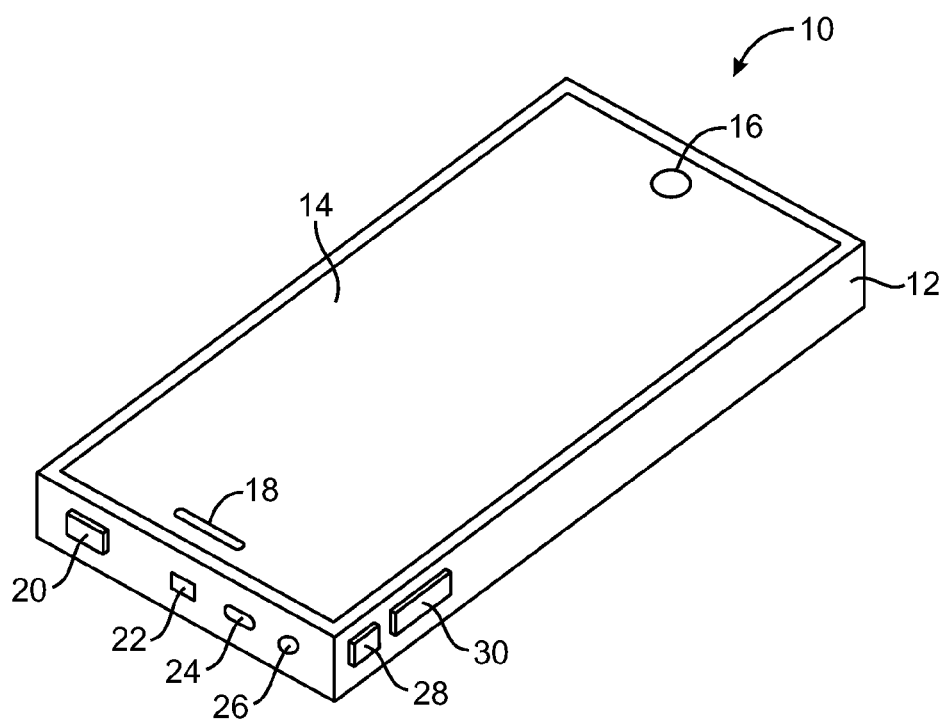
FIG. 3 is a bottom perspective view of an illustrative electronic device with an integral transmitter showing the bottom end of the device in accordance with an embodiment of the present invention.

As shown in FIG. 3, housing 12 may have a circular opening that forms audio jack port 26 and an opening such as opening 24 that forms a microphone port. Each end of device 10 or other portion of device 10 may also be provided with other structures (e.g., structure 22, which may be a window that passes wireless signals, part of a port in which a removable component may be inserted, a portion of housing structure 12 that passes wireless signals, an input-output port, a camera port, etc.).

The buttons in device 10 may be push buttons, toggling switches, momentary sliding buttons, rocker switches, or any other suitable types of buttons. As an example, buttons 16 and 20 may be momentary push buttons. Button 28 may be, as an example, a two-position button that toggles (e.g., by sliding up and down in the orientation of FIG. 3). Button 30 may be a rocker switch (e.g., a button that rocks back and forth horizontally in the orientation of FIG. 2.

To ensure that device 10 is compact and aesthetically pleasing, it may be desirable to construct and mount wireless components such as infrared light sources and the optical structures that are used in conjunction with these light sources in a way that either hides the components from view or that allows the components to blend in with surrounding structures.

Figure 4:
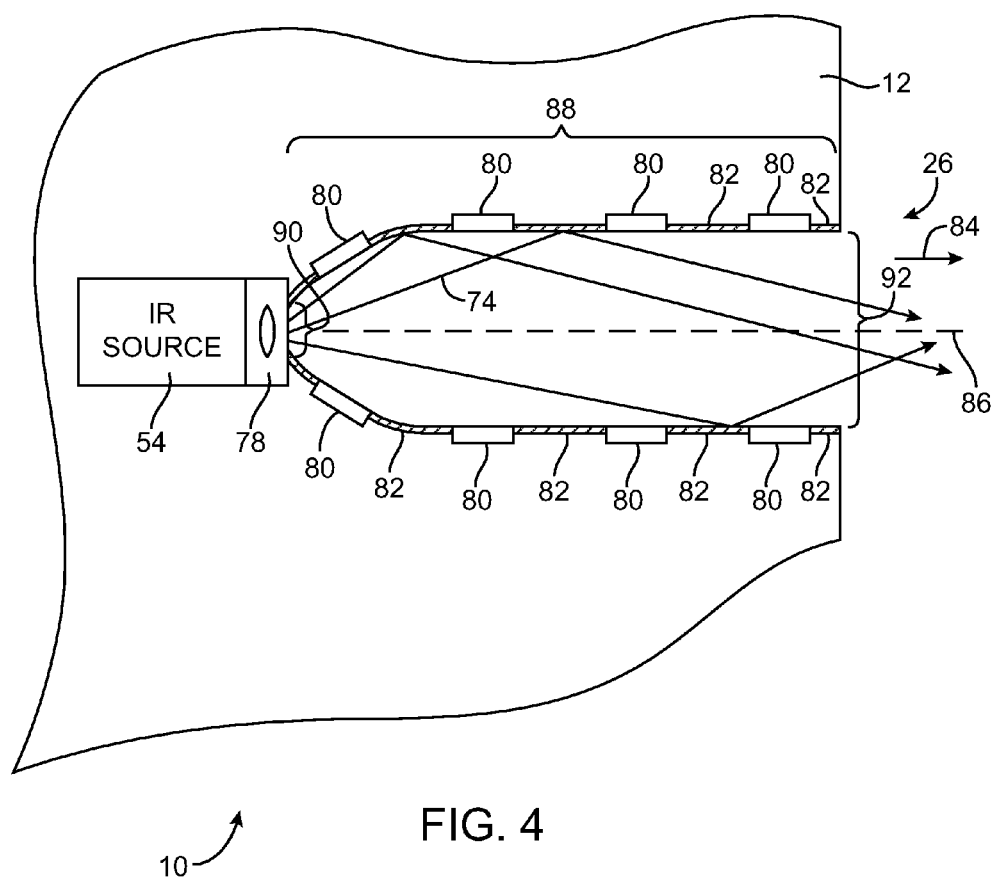
FIG. 4 is a cross-sectional side view of an audio jack having an integrated transmitter in accordance with an embodiment of the present invention.

FIG. 4 shows how a wireless transmitter such as an infrared light source (source 54) may be mounted so as to emit light in direction 84 along longitudinal axis 86 of audio jack 88. Audio jack 88 may have contacts such as ring-shaped contacts 80. There may be, for example, four ring-shaped contacts 80, each of which surrounds a different portion of jack 88. These contacts may sometimes be referred to as tip, ring, ring, and sleeve contacts and mate with corresponding contacts on a TRRS audio plug such as a 3.5 mm (⅛") plug. Jacks with contacts of this type are sometimes referred to as TRRS jacks.

Both ends of audio jack 88 may have openings. Opening 90 at the end of audio jack 88 that is adjacent to source 54 may allow light that is emitted from source 54 to pass into the cylindrical cavity of audio jack 88. Opening 92 at the other end of audio jack 88 (i.e., the circular opening in housing 12 that defines the circular shape for audio port 26) allows light 74 to escape from housing 12. If desired, the interior surfaces of jack 88 may be provided with reflective structures 80 (e.g., rings or plates of metal) to reflect light along jack 88 and thereby help reduce light losses. Insulating structures such as rings of plastic or other dielectric materials may be interposed between respective conductive structures (i.e., to prevent shorts within structures 80 and 82).

An optional lens such as lens 78 may be interposed between hole 90 and source 54 (e.g., to help collimate emitted light 74).

Figure 5:
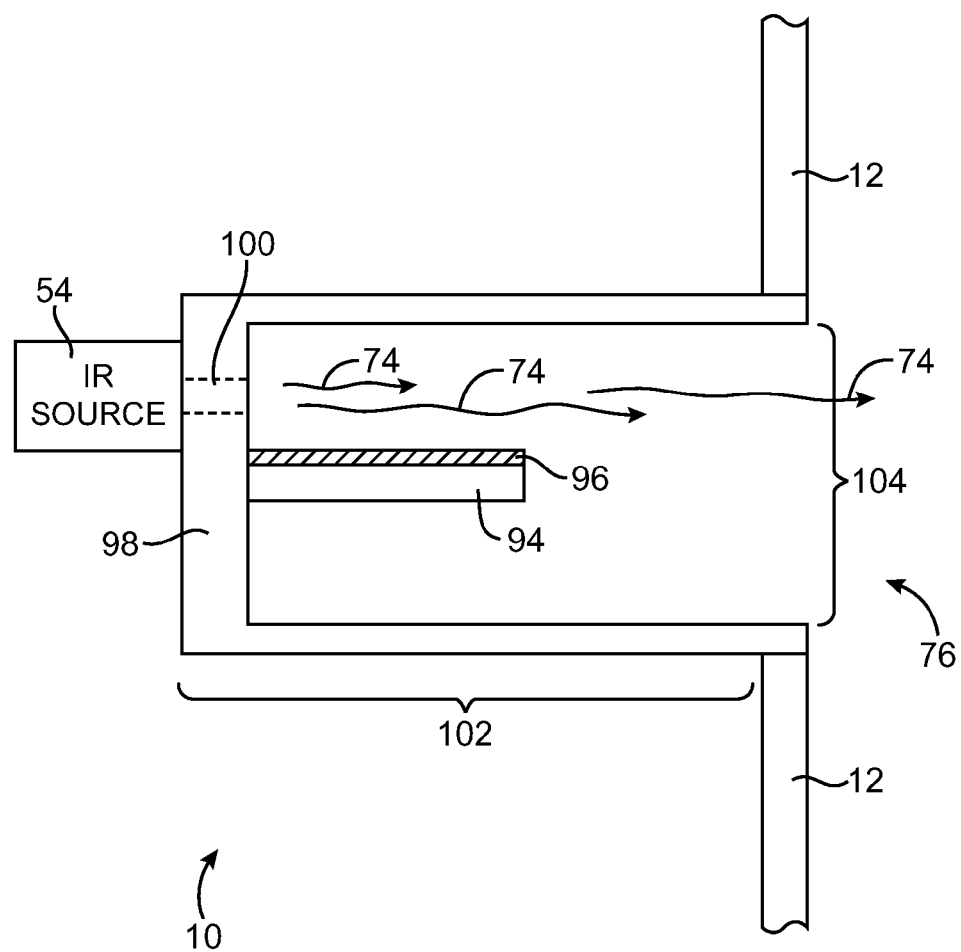
FIG. 5 is a cross-sectional side view of a data port with an integrated transmitter in accordance with an embodiment of the present invention.

As shown in FIG. 5, input-output ports such as input-output port 76 of FIG. 2 may be provided with light transmitters. Port 76 may be formed from a connector (connector 102) mounted to opening 104 in housing 12. Infrared source 54 may, for example, be mounted behind a hole such as opening 100 in rear portion 98 of connector 102. Electrical contacts 96 (pins) may be mounted on a dielectric support such as dielectric structure 94. Opening 100 may be located above or below structures 94 and 96, so that light 74 can escape from opening 104. A lens such as lens 70 (FIG. 4) may be interposed between source 54 and opening 100 if desired.

Figure 6:
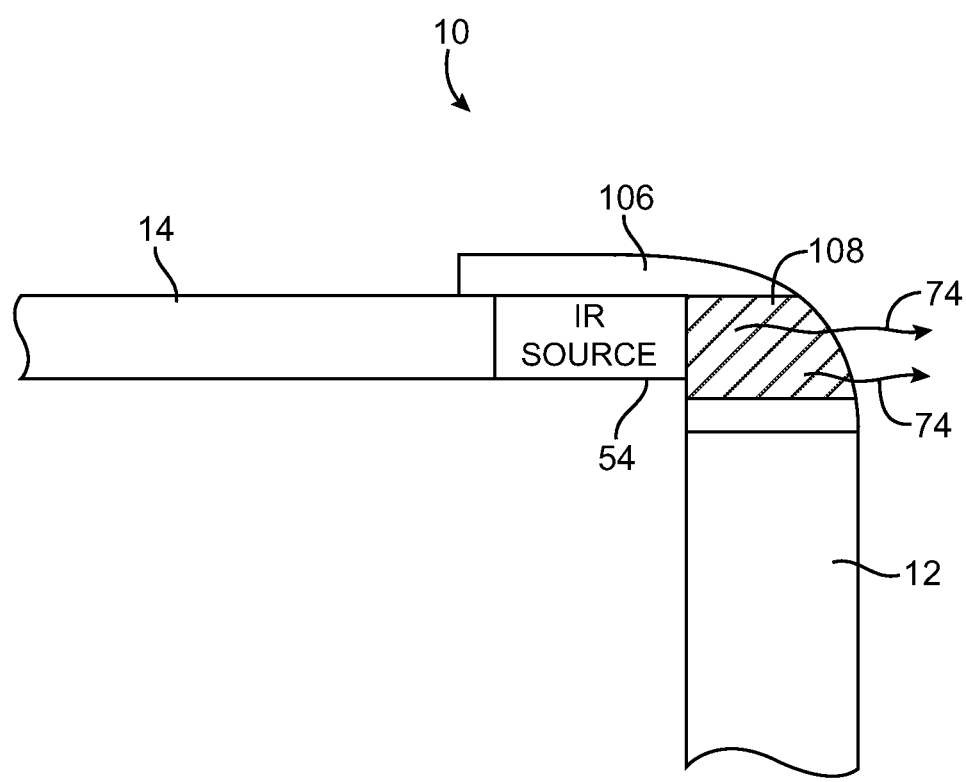
FIG. 6 is a cross-sectional side view of a housing structure such as a gasket or bezel structure that serves as a window for wireless signals in accordance with an embodiment of the present invention.

As shown in FIG. 6, a structure such as structure 106 may surround some or all of the edges of display 14 (e.g., the cover glass portion of display 14). Structure 106 may be a bezel structure, a gasket, a housing structure, combinations of bezel structures, gasket structures, and housing structures, etc. Structure 106 may be formed from a single member or multiple structures that are attached to device 10 (e.g., using fasteners, adhesive, welds, etc.). If desired, a window structure such as window 108 may be formed in structure 106. Window 108 may be, for example, a material that is sufficiently transparent to allow infrared light 74 from source 54 to escape to the exterior of housing 12. Structure 106 may be formed from plastic, glass, metal, etc. Window 108 may be formed from the same material as structure 106 (i.e., as part of a unitary plastic piece) or may be formed from a different material (e.g., a glass or plastic insert in a metal bezel or other housing structure). To avoid calling attention to the location of window 108, window 108 may be formed from the same material as the rest of structure 106 or may be formed from a material that has substantially the same appearance as the rest of structure 106. This type of approach may help to reduce visual clutter in device 10.

Figure 7A:
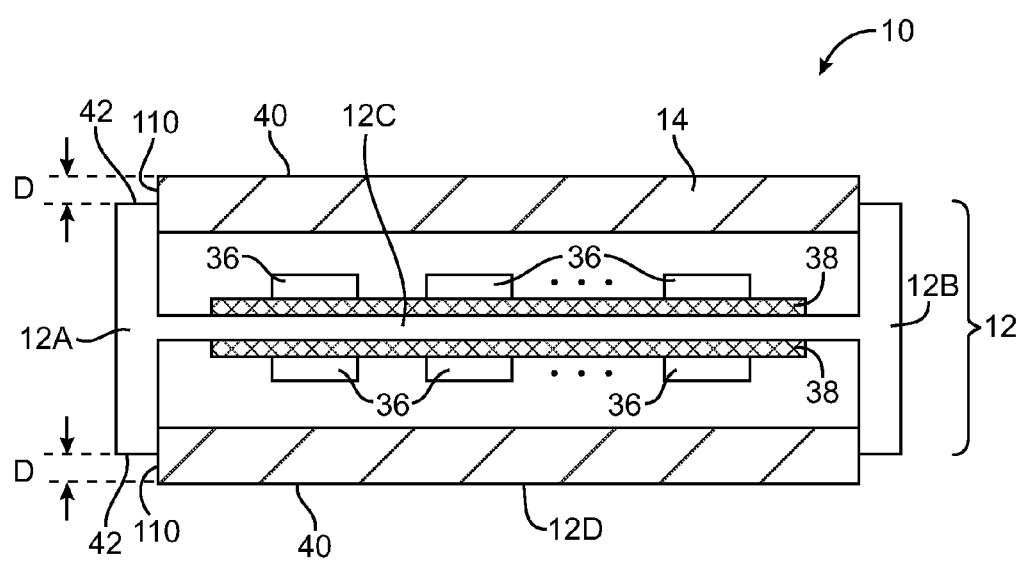
FIG. 7A is a cross-sectional end view of an electronic device showing how planar glass structures may be mounted in a configuration in which the outermost surface of the glass is proud of surrounding housing surfaces in accordance with an embodiment of the present invention.

If desired, light may be emitted through housing structures such as planar front or rear housing structures. FIG. 7A is a cross-sectional end view of device 10 showing how display 14 (e.g., a cover glass layer and associated image pixel structures) may be mounted to an upper surface of device 10. As shown in FIG. 7A, housing 12 may include sidewall structures such as housing sidewall structures 12A and 12B. Housing 12 may, for example, have upper (top end), lower (bottom end), left, and right sidewalls (i.e., four peripheral sidewalls associated with the four edges that run along the periphery of a rectangular housing). In this type of arrangement, the housing sidewalls can be formed from a band-shaped peripheral member that surrounds device 10. Housing sidewall structure 12A may correspond to a left-hand sidewall and housing sidewall structure 12B may correspond to a right-hand sidewall. An internal frame or support structure such as a metal plate or other planar housing member 12C may have a left edge welded or otherwise attached to left sidewall 12A and a right edge welded or otherwise attached to right sidewall 12B. There may be one or more structures such as plate 12C in device 12.

The front surface of device 10 may be occupied by display 14. Display 14 may be formed using a touch screen display or other suitable display. Display 14 may be mounted to housing 12 using gaskets, plastic frame members, or other suitable attachment mechanisms. The rear surface of device 10 (i.e., the side of device 10 opposing the side that includes display 14) may be occupied by housing layer 12D. Layer 12D may be formed from metal, glass, ceramic, composites, plastic, other materials, or combinations of these materials. As an example, layer 12D may be formed from a planar glass layer. If desired, layer 12D may be formed from part of a display (e.g., a cover glass for a rear-facing display that complements display 14 on the front surface of device 10). Passive arrangements in which layer 12D is formed from a piece of plastic or glass may also be used. Layer 12D may be formed from a separate layer of material that has been attached to the sidewalls of housing 12 or may be formed as an integral portion of housing 12 (e.g., as a unibody housing in which the housing sidewalls have been formed from the same piece of material as layer 12D).

As shown in FIG. 7A, display 14 and/or rear planar member 12D may have surfaces 40 that extend outward farther than surfaces 42 of housing 12. For example, surfaces 40 and housing surfaces 42 may be offset by distances D, as shown in FIG. 7A. When device 10 has this type of surface structures, light source 54 may be mounted so as to emit light through one or more exposed peripheral edges 110.

Figure 7B:
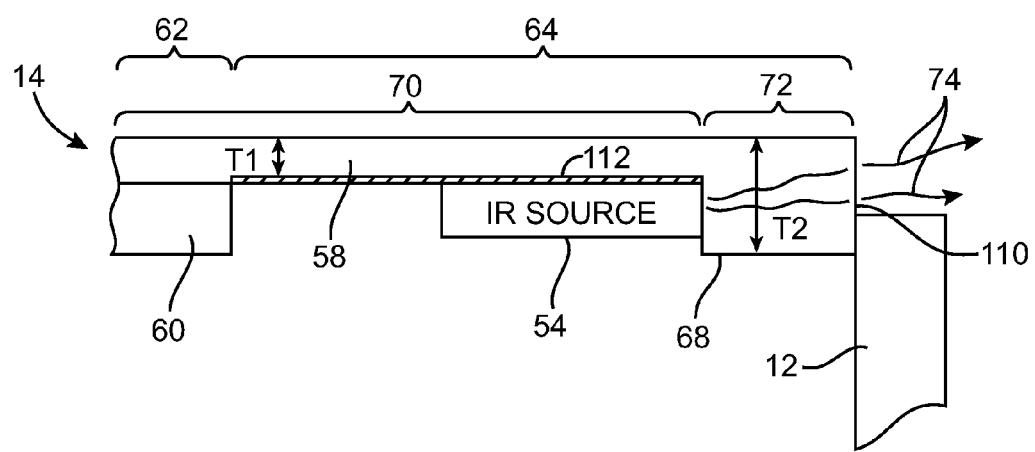
FIG. 7B is cross-sectional side view of an electronic device having a display with a vertically protruding cover glass layer through which infrared wireless signals may be transmitted by an infrared source in accordance with an embodiment of the present invention.

As shown in FIG. 7B, for example, display 14 may have a cover glass layer (layer 58). One of the edges of layer 58 may have an end surface (display end surface 110) through which light 74 from source 54 may be emitted. Display 14 may have an active area such as area 62 in which cover glass layer 58 is located above display structure 60 (i.e., active image pixels) and an inactive area such as area 64. Area 64 may, if desired, be coated with a layer of opaque ink 112. Portion 70 of cover glass 58 may have a first thickness T1. Portion 72 may have the same thickness or may have a larger thickness T2. Source 54 may be mounted adjacent to end 110 of glass 58 to allow light 74 to exit device 10 without being blocked by housing walls 12. This type of arrangement may, if desired, by used for rear housing structure 12D of FIG. 7A (i.e., a rear planar glass layer).

Figure 8:
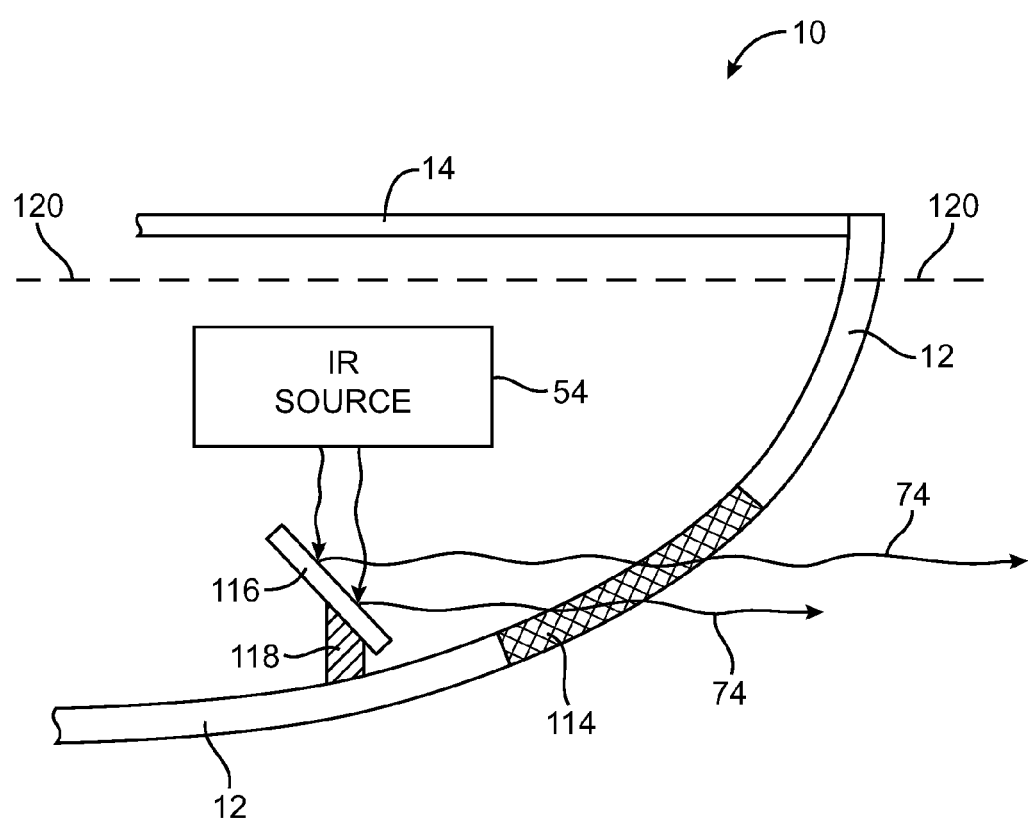
FIG. 8 is a cross-sectional side view of a portion of an electronic device and an associated infrared light transmitter showing how a mirror may be used to direct transmitted light through a window structure in a housing for the electronic device in accordance with an embodiment of the present invention.

In some device configurations it may be desirable to use mirrors to help direct light 74. This type of arrangement is shown in FIG. 8. As shown in the cross-sectional side view of FIG. 8, source 54 may be mounted within device 10 so as to emit light downwards. Mirror 116 may be mounted to housing 12 using support structure 118. When light 74 that is traveling downwards strikes mirror 116, this light is reflected horizontally through window 114 to exit device 10. Window 114 may be formed from a material that is transparent to infrared light (e.g., glass, plastic, etc.). The material of window 114 may be the same as the material used to form housing 12 or may be a different material (e.g., a transparent plastic window in an opening in housing 12). By using reflective structures such as mirror structure 116, light may be emitted in a desired direction (i.e., along longitudinal axis 120 of device 10), without requiring that source 54 be oriented in the same way.

Figure 9:
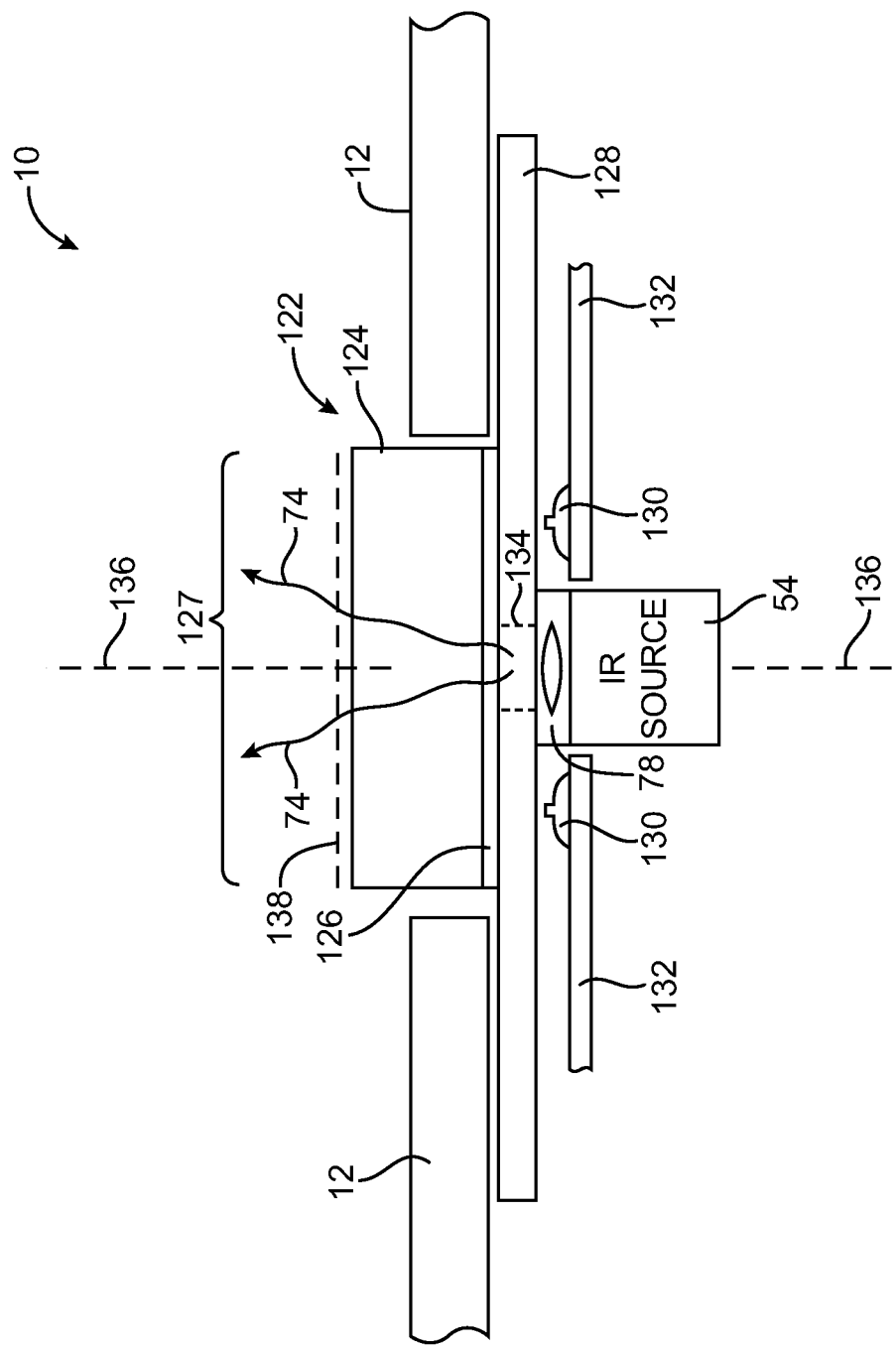
FIG. 9 is a cross-sectional side view of a button through which infrared signals may be transmitted in accordance with an embodiment of the present invention.

Source 54 may, if desired, emit light through a moving structure such as a button. As shown in FIG. 9, a button such as button 122 may be mounted in opening 127 in housing 12 of device 10. Button 122 may include a button member such as button member 124. Button member 124 may, for example, be formed from glass or clear (infrared-transparent) plastic. Layers 126 such as layers of adhesive and optional opaque ink may be interposed between button member 124 and button plate structure 128. During operation, button 122 may reciprocate back and forth along button axis 136. Source 54 may be mounted to plate 128 so that source 54 moves as button 122 reciprocates or source 54 may be mounted to a fixed structure such as housing 12 or support 132 so that source 54 remains stationary while button 122 reciprocates. When pressed inwards, button plate 128 compresses one or more switches such as dome switches 130 mounted on support structure 132. Infrared source 54 may be mounted adjacent to opening 134 in plate 128, so that light 74 exits device 10 through button member 124. Button member 124 may have the shape of a lens, as shown by dashed convex lens outline 138. This allows button member 122 to focus light. Optional internal lens structures such as lens 78 of FIG. 4 may be provided in device 10 of FIG. 9 or other device that includes source 54.

Figure 10:
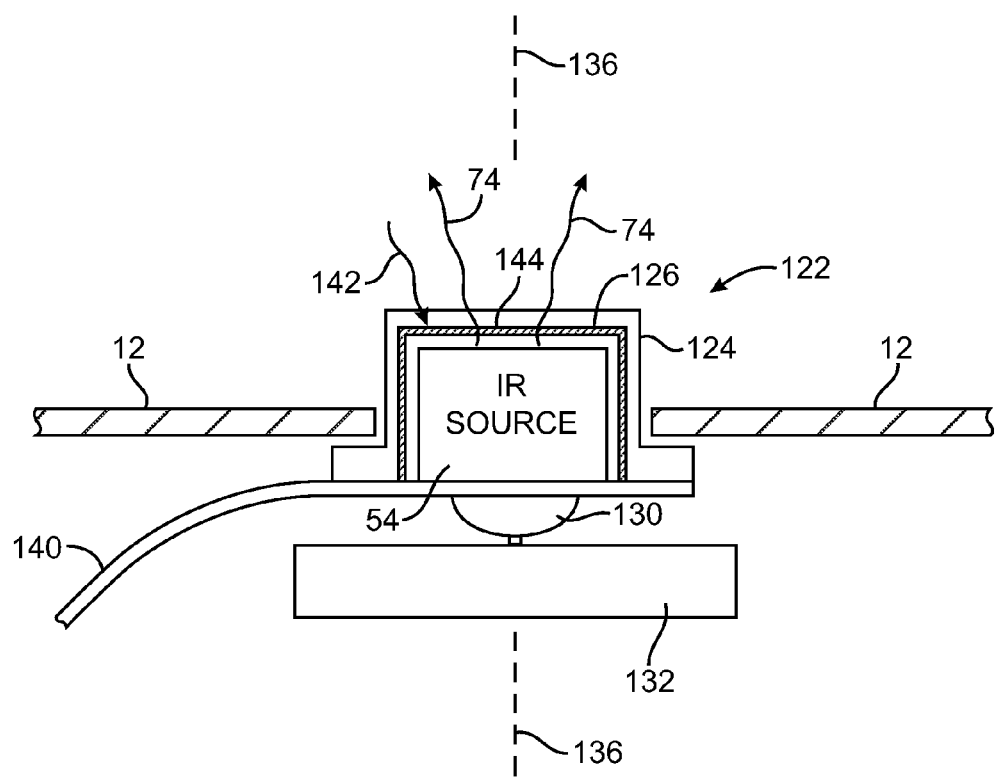
FIG. 10 is a cross-sectional side view of a button that includes an infrared source for transmitting light signals in accordance with an embodiment of the present invention.

As shown in FIG. 10, source 54 may be integrated within a hollow cavity in button member 124. With this type of configuration, both source 54 and member 124 reciprocate along axis 136 during operation of button 122. A layer of visibly-opaque but infrared-transparent ink (layer 126) may be included in button 122 (and other structures in which it is desired to block source 54 and associated structures from view). With this type of configuration, external visible light 142 can be blocked at surface 144 of layer 126, but infrared light 74 can pass through layer 126. Flex circuits such as flex circuit 140 may be used to route electrical signals to and from dome switch 130 or other switching structures in button 122.

Figure 11:
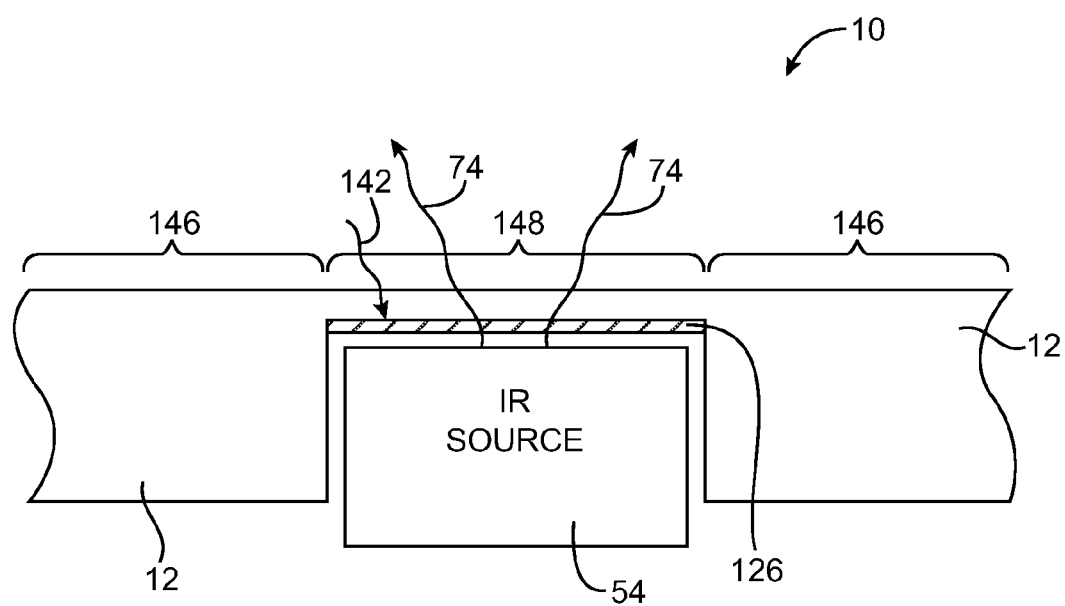
FIG. 11 is a cross-sectional side view of a housing having a recess that forms a thinned housing wall structure through which infrared light may pass in accordance with an embodiment of the present invention.

As shown in the cross-sectional side view of FIG. 11, housing 12 may be provided with thin regions that serve as windows for infrared light 74. In the FIG. 11 example, housing 12 has thick regions 146 and thin region 148. Optional opaque layer 126 (i.e., visibly opaque ink that is transparent to infrared light) may be placed under thin region 148 to enhance the visible light blocking properties of housing 12 in region 148. Thin region 148 may have a thickness of less than 0.1 mm or other thickness that is sufficiently thin to allow infrared light 74 from source 54 to pass through housing wall 12. The remainder of housing (i.e., regions 146) may be constructed with larger thicknesses (e.g., 0.3 mm or more) to ensure that housing 12 is mechanically strong. This type of arrangement provides device 10 with a smooth uninterrupted external appearance in the vicinity of source 54 without compromising the overall strength of housing 12.

Figure 12:
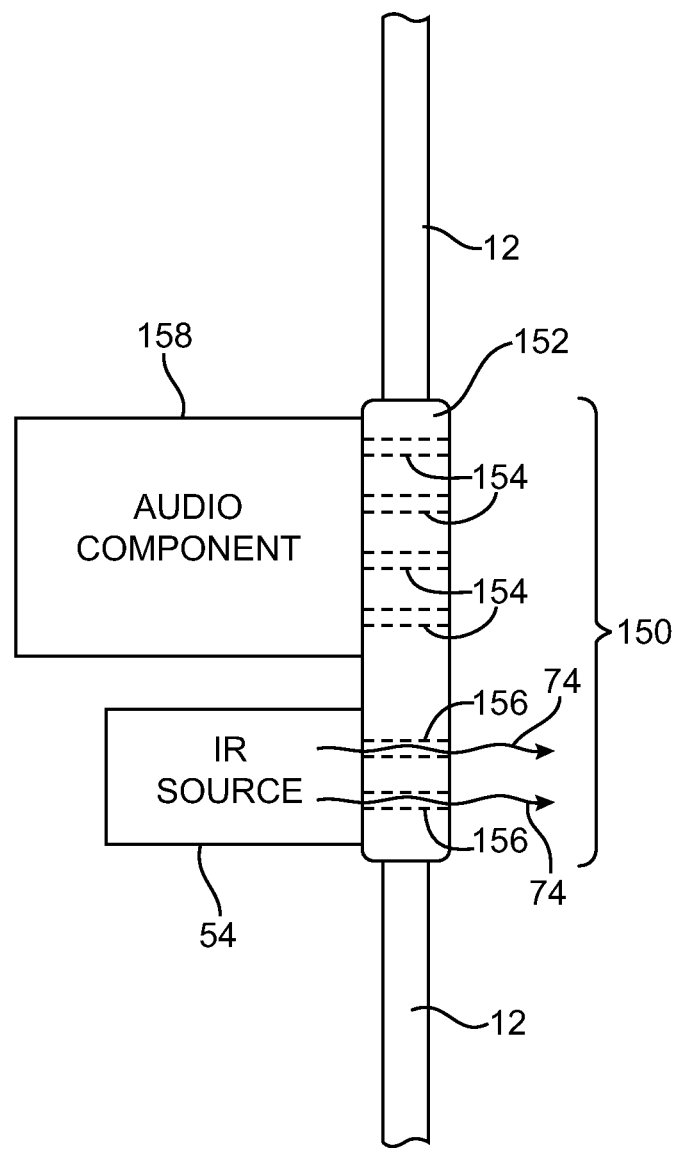
FIG. 12 is a cross-sectional side view of an audio port through which infrared light may pass in accordance with an embodiment of the present invention.

FIG. 12 shows how source 54 may be mounted within an audio port such as audio port 150. Audio port 150 may be a microphone port or a speaker port. Audio component 158 may be a microphone or a speaker. Acoustically transparent structures such as audio port structures 152 may be mounted in an opening in housing 12 that is associated with port 150. Structures 152 may be formed from wire and plastic mesh structures, integral portions of housing 12 or separate metal and/or plastic pieces with small holes (e.g., "microperf" holes of less than 0.5 mm in diameter, less than 0.3 mm in diameter, or less than 0.2 mm in diameter), foam, or other materials that allow sound to pass through port 150. The openings in structures 152 that allow sound to pass between component 158 and the exterior of device 10 are illustrated as holes 154 in FIG. 12. If desired, openings 154 may be formed directly in portions of housing 12 (e.g., in an aluminum or stainless steel housing structure or in a plastic housing). Openings 156 in structures 152 may be formed adjacent to openings 154 and may be used to allow light 74 from source 54 to be emitted from the interior of device 10. Openings 154 and 156 may have the same size and shape or may have different sizes and shapes. With arrangements of the type shown in FIG. 12, a user will generally only be able to observe the presence of a single port (audio port 150) from the exterior of device 10, even though source 54 is present behind portions of structures 152. As a result, visual clutter is reduced. If desired, one or more microperf openings such as openings 156 may be formed in other regions of housing 12 to allow light from an associated source 54 to be emitted. Such regions of housing 12 may appear visually opaque and substantially visually identical to surrounding adjacent housing regions to a user of device 12, because microperf openings are small enough to be invisible or nearly invisible to the naked eye. The microperf openings may be formed on one end of device 10 (e.g., on a top end wall structure of housing 12 where illustrated by structure 22 of FIG. 3).

Figure 13:
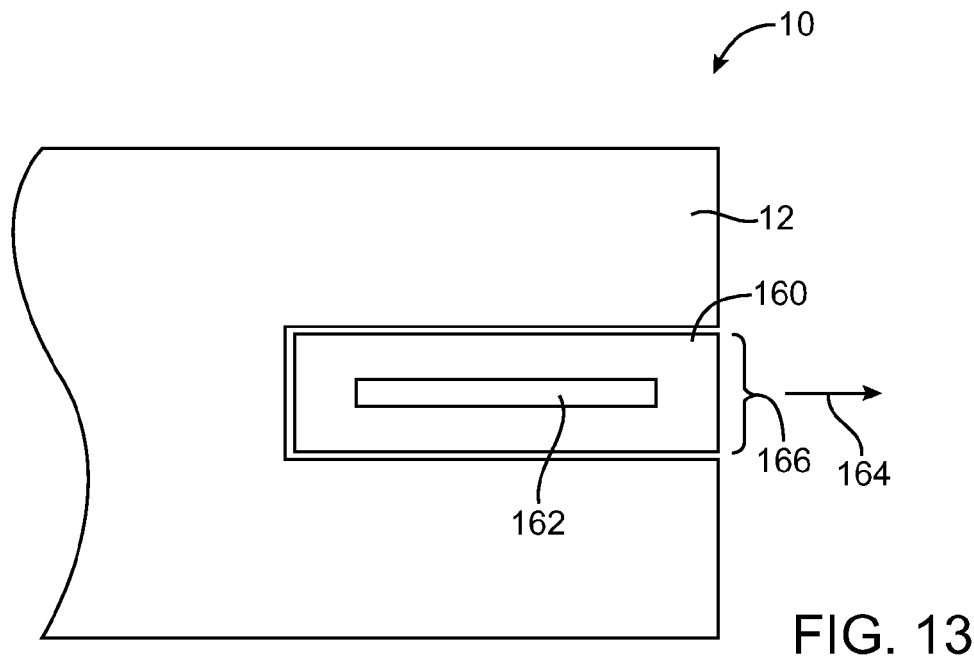
FIG. 13 is a cross-sectional side view of a port that accommodates a removable component in an electronic device in accordance with an embodiment of the present invention.
Figure 14:
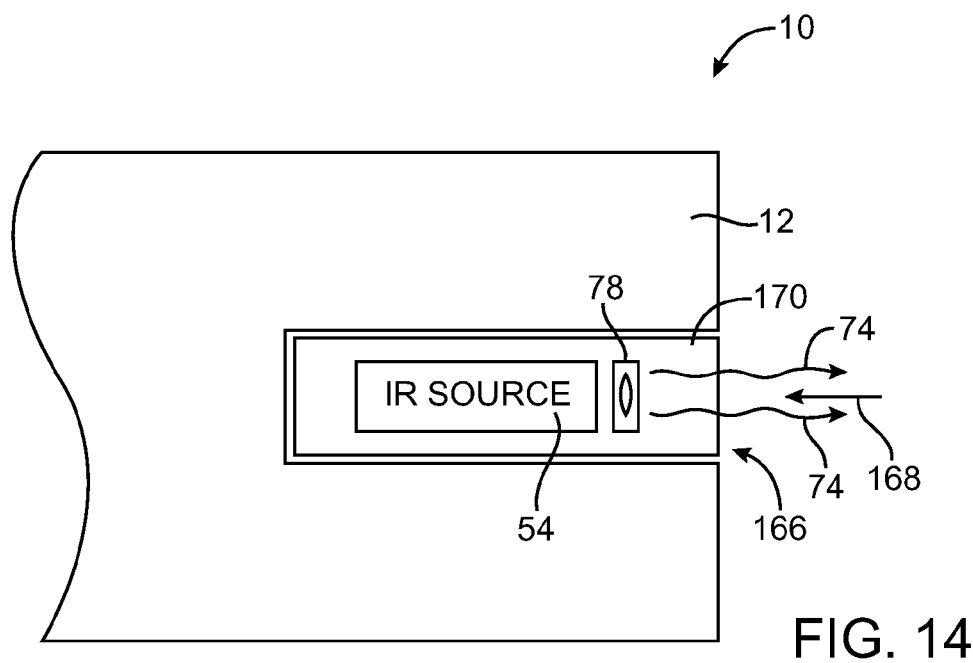
FIG. 14 is a cross-sectional side view of the port of FIG. 13 in which the removable component of FIG. 13 has been replaced with a removable wireless transmitter accessory having an infrared source in accordance with an embodiment of the present invention.

It may be desirable to provide a user of device 10 with the option of installing a light transmitter such as source 54 in the form of a removable accessory. This type of arrangement is illustrated in FIGS. 13 and 14. As shown in FIG. 13, device 10 may have an opening such as opening 166 in housing 12. A removable component such as component 160 may be installed in device 10 through opening 166 (e.g., so that the external surface of component 160 is substantially flush with the external surface of housing 12). Opening 166 may form an opening for an adapter slot. Component 160 may contain device 162. Device 162 may be, for example, a subscriber identity module, a flash memory card, or a radio-frequency wireless adapter. If the user wishes to provide device 10 with infrared transmission capabilities to support remote control of external equipment 76 (FIG. 1), component 160 may be removed from device 10 in direction 164.

As shown in FIG. 14, once component 160 of FIG. 13 has been removed from device 10, a correspondingly sized infrared transmitter accessory such as infrared transmitter component 170 may be inserted into device 10 into the slot vacated by component 160 (i.e., by inserting component 170 into the slot in direction 168). Component 170 may serve as an infrared accessory or adapter and may include infrared source 54 and optional lens structure 78. During operation, light 74 may be emitted through opening 166 as shown in FIG. 14. Opening 166 may, for example, be formed in the top end of device 10 (e.g., in the location of structure 22 of FIG. 3).

Figure 15:
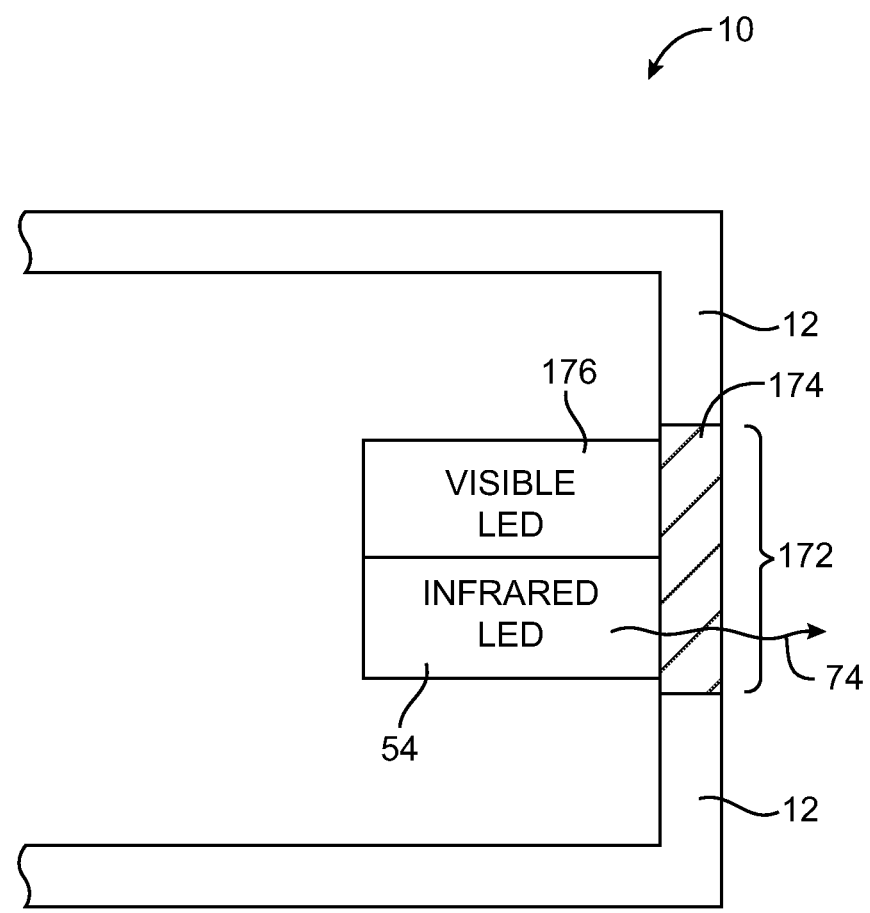
FIG. 15 is a cross-sectional side view of an illustrative status indicator window in an electronic device that is being shared by a wireless remote control transmitter such as an infrared light-emitting-diode source in accordance with an embodiment of the present invention.

FIG. 15 shows how infrared source 54 may be mounted behind the same window as a visible light source such as status light-emitting diode 176. When desired, light-emitting diode 176 may be turned on to serve as a status indicator for a user of device 10. Infrared source 54 may be mounted adjacent to source 176 behind common window 174. Window 174 may be formed from a visibly transparent and infrared transparent material such as glass, a thin portion of housing 12, a portion of housing 12 with small (microperf) openings (e.g., openings of less than a fraction of a millimeter in diameter), etc. Because only a single window (window 172) is visible to a user with this type of arrangement, visual clutter is minimized.

The foregoing is merely illustrative of the principles of this invention and various modifications can be made by those skilled in the art without departing from the scope and spirit of the invention. The foregoing embodiments may be implemented individually or in any combination.

What is claimed is:

1. An electronic device, comprising:
   a housing; and
   a button mounted in the housing; and
   a remote control infrared source that emits infrared light that controls external equipment, wherein the remote control infrared source emits the infrared light through the button and wherein the electronic device comprises a portable electronic device.

2. The electronic device defined in claim 1 wherein the button comprises a button member having a portion that is transparent to infrared light and wherein the remote control infrared source emits the infrared light through the portion that is transparent to infrared light, wherein the electronic device comprises a handheld electronic device.

3. The electronic device defined in claim 2 wherein the button member comprises a cavity within which the infrared source is mounted.

4. The electronic device defined in claim 1 wherein the button comprises a button member that reciprocates relative to the housing and wherein the remote control infrared source is fixed to the button member.

5. The electronic device defined in claim 1 further comprising:
   unidirectional communications circuitry coupled to the remote control infrared source.

6. An electronic device, comprising:
   a housing; and
   a button mounted in the housing; and
   an infrared source that emits infrared light through the button, wherein the housing has front and rear planar surfaces together having a first exterior surface area, top and bottom end walls together having a second exterior surface area, and left and right sidewalls together having a third exterior surface area, wherein the first exterior surface area is greater than the second exterior surface area and is greater than the third exterior surface area, and wherein the button is formed within an opening in the top end wall of the housing.

7. The electronic device defined in claim 6 wherein the button comprises a button member that reciprocates relative to the housing while the infrared source is stationary relative to the housing.

8. The electronic device defined in claim 6 wherein the second exterior surface area is less than the third exterior surface area.

9. The electronic device defined in claim 8 further comprising a display mounted in the front planar surface.

10. The electronic device defined in claim 9 further comprising at least one button mounted in one of the left and right sidewalls.

11. An electronic device that serves as a remote control that controls external equipment with infrared light, comprising:
    a housing having an audio jack port opening;
    an audio jack in the audio jack port opening; and
    an infrared source that emits infrared light through the audio jack port opening that controls the external equipment.

12. The electronic device defined in claim 11 wherein the audio jack has a cylindrical cavity with at least four electrical contacts.

13. The electronic device defined in claim 12 further comprising reflective structures within the cylindrical cavity that reflect the infrared light emitted by the infrared source.

14. An electronic device, comprising:
    a housing having an audio port;
    an audio component mounted in the audio port; and
    an infrared source mounted in the audio port.

15. The electronic device defined in claim 14 wherein the audio port includes a structure with holes that pass sound from the audio component and that pass infrared light from the infrared source.

16. The electronic device defined in claim 15 in which the structure comprises a wire mesh.

17. An electronic device, comprising:
    a housing;
    a planar glass structure mounted in the housing, wherein the planar glass structure has peripheral edges; and
    an infrared light source that emits light through at least one of the peripheral edges.

18. The electronic device defined in claim 17 further comprising a display, wherein the planar glass structure comprises a cover glass layer associated with the display.

19. The electronic device defined in claim 17 wherein the housing has opposing first and second sides, the electronic device further comprising a display mounted on the first side of the housing, wherein the planar glass structure comprises a glass plate mounted on the second side of the housing.

20. An electronic device, comprising:
    a housing having an audio jack port opening;
    an audio jack in the audio jack port opening;
    an infrared source that emits infrared light though the audio jack port opening; and
    reflective structures within the audio jack that reflect the infrared light emitted by the infrared source.

21. The electronic device defined in claim 20 wherein the electronic device comprises a remote control that controls external equipment with the infrared light.

* * * * *